US012601590B2

(12) United States Patent (10) Patent No.: US 12,601,590 B2

Reynen (45) Date of Patent: Apr. 14, 2026

(54) METHOD TO CONTROL GAP FOR SHEET MANUFACTURING MEASUREMENT PROCESSES

(71) Applicant: Honeywell International Inc., Charlotte, NC (US)

(72) Inventor: Greg Reynen, North Vancouver (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 283 days.

(21) Appl. No.: 18/212,434

(22) Filed: Jun. 21, 2023

(65) Prior Publication Data

US 2024/0426604 A1 Dec. 26, 2024

(51) Int. Cl.
*G01B 21/16* (2006.01)
*D21F 7/06* (2006.01)
(Continued)

(52) U.S. Cl.
CPC .............. *G01B 21/16* (2013.01); *D21F 7/06* (2013.01); *G01N 21/89* (2013.01); *G01N 23/16* (2013.01); *G01B 11/0691* (2013.01); *G01B 15/025* (2013.01); *G01N 2021/8917* (2013.01); *G01N 2223/04* (2013.01); *G01N 2223/1016* (2013.01); *G01N 2223/102* (2013.01); *G01N 2223/32* (2013.01); *G01N 2223/34* (2013.01); *G01N 2223/622* (2013.01); *G01N 2223/633* (2013.01); *G01N 2223/642* (2013.01)

(58) Field of Classification Search
None
See application file for complete search history.

(56) References Cited

U.S. PATENT DOCUMENTS

| | | | |
|---|---|---|---|
| 5,432,353 A | 7/1995 | Goss | |
| 5,714,763 A | 2/1998 | Chase | |
| (Continued) | | | |

FOREIGN PATENT DOCUMENTS

| | | |
|---|---|---|
| KR | 100910461 B1 | 8/2009 |

OTHER PUBLICATIONS

Tojo et al., New Method of Sheet Thickness Inspection: Improvement in the accuracy of the thickness measuring system during the measuring process., IEEE Xplore, Oct. 24, 2004.

*Primary Examiner* — Thomas R Artman
(74) *Attorney, Agent, or Firm* — Seager, Tufte & Wickhem, LLP

(57) ABSTRACT

Sensors used in sheet manufacturing environments can be sensitive to the gap between the scanner heads. Nuclear gauges measure both the sheet product and gas in the column between the scanner heads. The gap distance can affect the measurement in a linear or non-linear fashion depending on the sensing principle High frequency vibrations can cause the sensor devices therein to move. Techniques for controlling the sensor gap between operative surfaces on dual scanner heads during measurement operation employs a closed-loop control where piezoelectric actuators are used to maintain a constant gap throughout the scan by closing the error signal on the gap measurement sensor. A system for measuring a property of a continuous sheet includes dual scanner heads housing radiation emitters and receivers. Gap measurement signals energize the actuators that adjust the position of one or both sensor devices to maintain the gap at a desired distance.

18 Claims, 4 Drawing Sheets

Radiation Source (100)

Radiation Detector (102)

(51) Int. Cl.
  *G01B 11/06*     (2006.01)
  *G01B 15/02*     (2006.01)
  *G01N 21/89*     (2006.01)
  *G01N 23/16*     (2018.01)

(56)      References Cited

U.S. PATENT DOCUMENTS

| | | | |
|---|---|---|---|
| 6,281,679 B1 * | 8/2001 | King | G01B 21/08 |
| | | | 324/229 |
| 6,361,483 B1 | 3/2002 | Kirchner | |
| 6,967,726 B2 | 11/2005 | King | |
| 7,319,521 B2 * | 1/2008 | Typpoe | G01B 11/0691 |
| | | | 356/630 |
| 8,256,103 B2 | 9/2012 | Choy | |
| 9,121,832 B2 * | 9/2015 | Beselt | G01N 33/346 |
| 9,279,713 B2 * | 3/2016 | Ischdonat | G01N 22/00 |
| 9,416,492 B1 * | 8/2016 | Austin | D21G 9/0009 |
| 9,612,213 B2 * | 4/2017 | Meijer Drees | G01N 33/346 |
| 9,753,114 B2 * | 9/2017 | Beselt | G01R 33/00 |
| 11,519,710 B2 | 12/2022 | Tixier | |
| 2005/0073694 A1 * | 4/2005 | King | G01B 21/08 |
| | | | 356/630 |
| 2005/0157314 A1 * | 7/2005 | Typpoe | G01B 11/0691 |
| | | | 356/630 |
| 2011/0214282 A1 * | 9/2011 | Choy | H01L 21/67132 |
| | | | 414/744.2 |
| 2013/0055912 A1 | 3/2013 | Beselt | |
| 2013/0277122 A1 * | 10/2013 | Ischdonat | G01N 33/346 |
| | | | 177/1 |
| 2015/0323375 A1 | 11/2015 | Meijer | |
| 2016/0123773 A1 * | 5/2016 | Beselt | D21G 9/0009 |
| | | | 324/202 |
| 2016/0215453 A1 * | 7/2016 | Austin | D21G 9/0009 |
| 2021/0262776 A1 * | 8/2021 | Tixier | G01D 5/2033 |
| 2024/0426604 A1 * | 12/2024 | Reynen | G01G 9/005 |

* cited by examiner

METHOD TO CONTROL GAP FOR SHEET MANUFACTURING MEASUREMENT PROCESSES

FIELD OF THE INVENTION

The present invention generally relates to scanning measurement systems for determining parameters of continuous sheet materials during production and, more particularly, to active measurements of a sensor gap within the dual scanning heads to control and maintain a constant sensor gap throughout the scan.

BACKGROUND OF THE INVENTION

It is well known to make on-line measurements of properties of continuous sheet materials during manufacture. The purpose of on-line measurements, generally speaking, is to enable monitoring of sheetmaking processes with the goal of enhancing sheet quality while reducing the quantity of substandard sheet material which is produced before undesirable process conditions are corrected.

Sensors for continuous flat sheet production processes typically employ single or double-sided packages with on-line sensors that traverse or scan traveling webs of sheet material during manufacture. Scanning usually is done in the cross direction, i.e., in the direction perpendicular to the direction of sheet travel. Typical transmission mode scanner systems include housings and that are mounted on opposite sides of a moving sheet (i.e., above and below the sheet) for movement across the sheet to measure a selected sheet parameter. A channel or column is formed between the upper and lower housings and the sheet can be disposed in the channel. In operation of the scanning system, the housings travel synchronously across the sheet on tracks that are mounted to the parallel horizontal frame members.

In practice, the housings serve as platforms for carrying sensors to detect sheet properties, such as basis weight. So, for example, an upper housing may carry a radiation source, such as a nuclear beta source, and a lower housing may carry a detector. In this case, the sensors can be employed to make basis weight measurements by measuring the radiation intensity incident on the detector when a sheet is present as compared to the beta radiation which is incident upon the detector, when no sheet is present; that is, the basis weight is measured by the beta radiation attenuated by the sheet material. On-line measurements during the production of continuous sheet materials are difficult to make accurately. Scanning sensor systems are susceptible to various errors. For example, if the vertical distance separating the housings does not stay constant during a scan, the incident radiation intensity will vary independently of variations in sheet properties.

Reflection mode scanner systems include a sensor that are mounted in an upper housing that faces a moving sheet In operation, radiation from a radiation source in the upper housing directed toward the sheet and the reflected radiation is received by a detector in the tipper housing. The distance between the sensor and moving sheet must be maintained.

Various techniques have been used to correct for sensor positional errors such as misalignment and the like. However, current methods do not provide dynamic active measurement and control of the sensor gap within the dual housings of scanning systems.

SUMMARY OF THE INVENTION

The present invention is directed to techniques for controlling the sensor gap within the measurement channel between dual scanner heads during the transmission measurement mode of operation. Many sensors used in sheet manufacturing environments are sensitive to the gap between the scanner heads. For example, nuclear basis weight sensors effectively measure both the weight of the product and the weight of the air in the column between the sensor halves. This is a function of gap distance and air temperature. Other types of sensors use a subtractive method to measure the distance to the surface of the product and subtract this from the total gap to obtain a caliper measurement, such as in laser caliper sensors. By controlling the gap, itself, the correction of the effects can be simplified on a per-sensor basis.

The invention is also directed to techniques for controlling the measurement gap between a sensor head and the reflective operative surface the corresponding mounting head or frame in reflective type scanner systems.

The invention is based in part on the recognition that some sensors can benefit from a closed-loop control where an actuator is used to maintain a constant sensor gap throughout the scan by closing the error signal on the gap measurement sensor. In one aspect, the invention is directed to a system for measuring a property of a continuous sheet which has a first side and a second side and which travels in a downstream machine direction that includes:

(a) a first scanner head disposed adjacent to a first side of the sheet, the first scanner head including:
  (i) a first sensor device that has a first movable sensor base that defines a first operative surface facing the first side of the sheet;
  (ii) a first adjustable actuator configured to move the first sensor base along a first axis;
(b) a second scanner head disposed adjacent to the second side of the sheet, the second scanner head comprising a second operative surface facing the second side of the sheet, wherein the first operative surface and the second operative surface define a sensor gap through which the continuous sheet travels;
(c) means for measuring the distance of the first sensor gap and generating first signals representative of the measured sensor gap distance; and
(d) control means for controlling the first adjustable actuator in response to the first signals to maintain the sensor gap distance at a desired gap distance.

In another aspect, the invention a system for monitoring characteristics of a continuous sheet which has a first side and a second side and which travels in a downstream machine direction that includes:

(a) a first mounting head, which is disposed adjacent to a first exterior surface of the sheet, including:
  (i) a first movable sensor base that defines a first operative surface facing the first exterior surface of the sheet;
  (ii) a first actuator configured to move the first sensor base along a first axis that is perpendicular to the first operative surface;
(b) a second mounting head disposed adjacent to the second exterior of the sheet, the second mounting head comprising a second operative surface facing the second exterior surface of the sheet, wherein the first operative surface and the second operative surface define a sensor gap through which the continuous sheet travels, wherein the first mounting head and the second mounting head are aligned and configured to move in a synchronized fashion in the cross direction, which is perpendicular to the machine direction, and wherein at least one sensor device is mounted in the first mounting head, the second mounting head, or in both;

(c) means for measuring the distance of the sensor gap and generating signals representative of the measured sensor gap distance; and (d) control means for controlling the first actuator in response to the signals to maintain the measurement gap distance at a desired gap distance.

In a further aspect, the invention is directed to method of controlling a system for monitoring properties of a continuous traveling web that includes a senor head that has an operative surface that is connected to an actuator for moving the operative surface. The method regulates the sensor gap between the operative surface and the traveling web and includes:

(a) monitoring the distance between the operative surface and traveling web and generating distance signals indicating a measured sensor gap distance;

(b) comparing a measured senor gap distance to a target sensor gap distance; and (c) maneuvering operative surface to adjust the sensor gap distance.

DETAILED DESCRIPTION OF THE PREFERRED EMBODIMENTS

Figure 1:
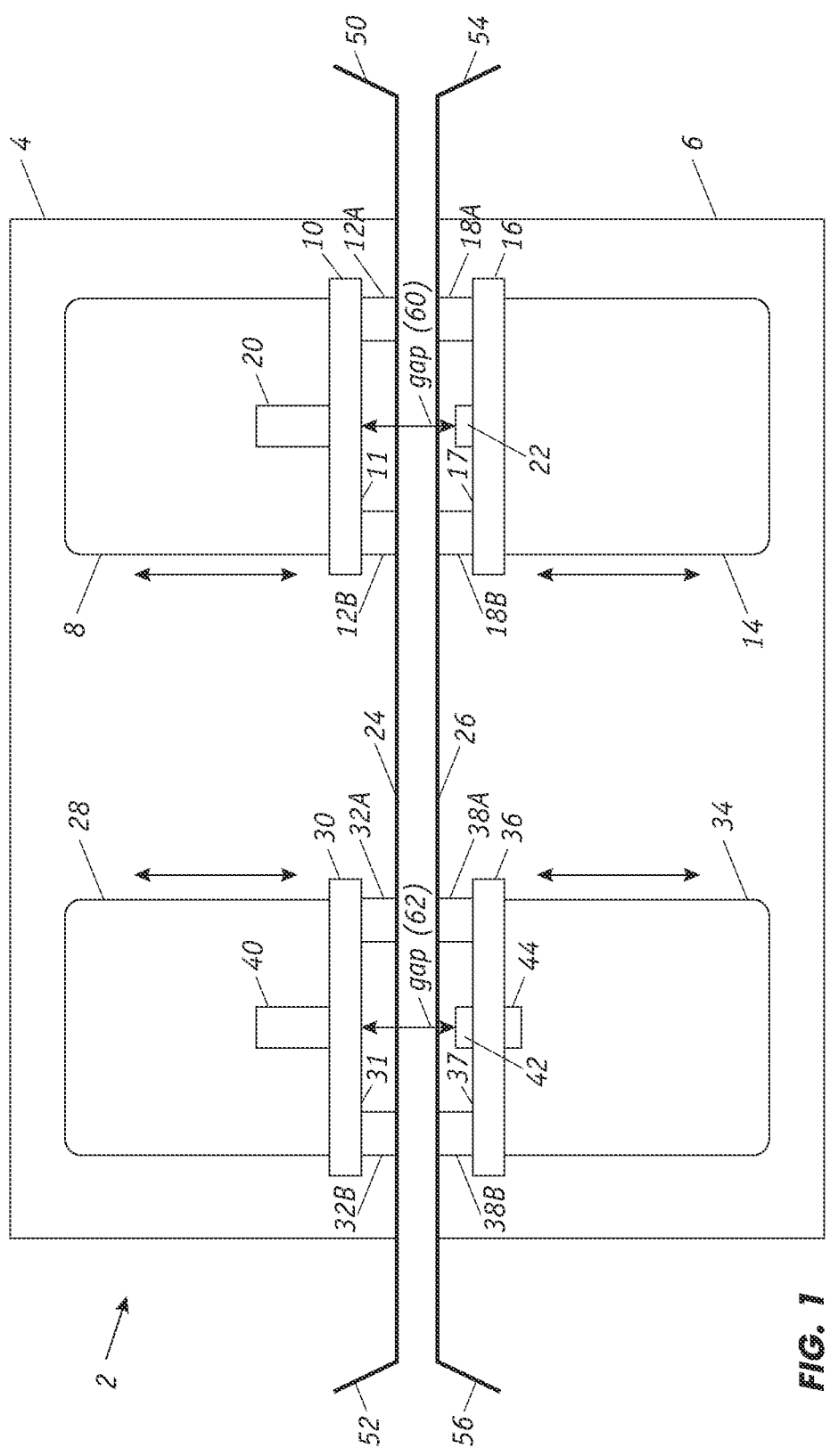
FIG. 1 is a side cross-sectional view of dual scanner heads.

FIG. 1 shows a dual scanning system 2 with scanner heads 4 and 6. The upper scanner head 4 houses a sensor device 8 that is supported on a baseplate 10 which has an operative planar surface 11. Actuators 12A and 12B, which are attached to the lower surface 24 of the upper scanner head 4, are secured to baseplate 10. The upper sensor head 4 also houses a sensor device 28 that is supported on a baseplate 30. Actuators 32A and 32B, which are attached to the lower surface 24 of the upper scanner head 4, are secured to baseplate 30 which has an operative planar surface 31. The upper scanner head 4 is equipped with upper sheet deflectors 50 and 52.

The lower scanner head 6 houses a sensor device 14 that is connected to a baseplate 16, which has an operative planar surface 17. Actuators 18A and 18B, which are attached to the upper surface 26 of the lower sensor head 6, are secured to baseplate 16. The lower scanner head 6 also houses a sensor device 34 that is connected to a baseplate 36 which has an operative planar surface 37. Actuators 38A and 38B, which are attached to the upper surface 26 of the lower scanner head 6, are secured to baseplate 36. The lower scanner head 6 is equipped with lower sheet deflectors 54 and 56.

The displacement between operative surface 11 of sensor device 8 and operative surface 17 of sensor device 14 define a gap 60 and the distance which can measured by displacement measurement means. A suitable apparatus is an inductive-type sensor that has an RF or z-coil 20 which positioned in sensor device 8 and measures the distance from z-coil 20 to a reference surface or plate 22 which is the sensor baseplate 16. Inductive-type sensors can particularly suited when the web or sheet being monitored is paper or plastic. The distance of gap 60 can also be measured by optical displacement, laser-based triangulation, inductive sensors, radar, capacitive sensors, magnetic field-based sensors, microwave radiation-based and acoustic-based sensors.

Similarly, the displacement between operative surface 31 of sensor device 28 and operative surface 37 of sensor device 34 define a gap 62 and the distance can be measured by displacement measurement means. In the case where the sheet product includes a metal substrate, a preferred displacement measurement mechanism includes an electromagnetic coil 40 which is positioned in sensor device 28 and first and second magnetic sensors 42 and 44 which are positioned in sensor device 34. The two magnetic sensors are preferably in tandem and aligned with the coil along an axis. The electromagnetic coil 40 is connected to a source of direct or alternating current (not shown) to generate a magnetic field that is measured by the pair of magnetic sensors, such as fluxgate magnetic sensors. Instead of using an electromagnetic coil and associated driving current, a permanent magnet can be used as the source of magnetic field. This magnetic displacement sensor reads through metal foil materials such as coated metal electrodes and is described U.S. Pat. No. 11,519,710 to Tixier et al., which is incorporated herein by reference.

Each of the actuators can comprise a multilayer piezoelectric actuator which is in the form of a piezoelectric stack; the stack can be used in conjunction with leverage to increase the actuation distance at the expense of peak force. Piezoelectric actuators can expand or contract upon actuation depending on the applied electric field. Thus, in one application, when the stack is energized, it elongates and pushes the baseplate to which it is secured in a vertical direction that is perpendicular to the associated operative surface. As illustrated in FIG. 1, each scanner head 4 and 6 can include a plurality of sensor devices each defining a sensor gap 60, 62. The displacement distances of the gaps can be the same or different and each gap is controlled independently of the other.

Figure 2:
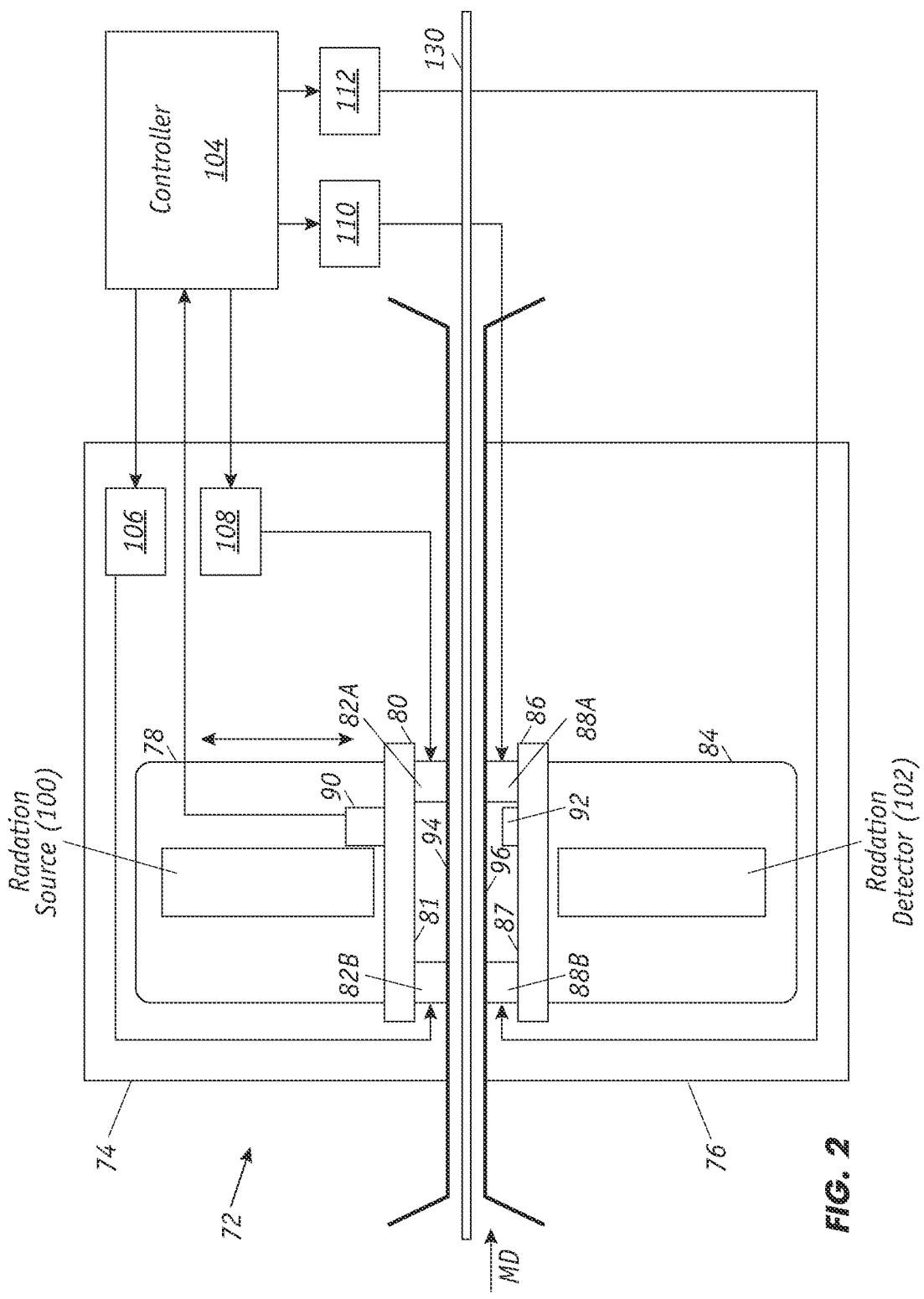
FIG. 2 is a side cross-sectional view of dual scanner heads operating in the transmissive mode.

FIG. 2 shows a dual scanning system 72 wherein the upper scanner head 74 houses a sensor device 78 that is supported on a baseplate 80 which has operative planar surface 81. Actuators 82A and 82B, which are attached to the lower surface 94 of the upper scanner head 74, are secured to baseplate 80. The sensor device 78 includes a radiation source 100. The lower scanner head 76 houses a sensor device 84, which includes a radiation detector 102, that is connected to a baseplate 86 which has operative planar surface 87. Actuators 88A and 88B, which are attached to the upper surface 96 of the lower sensor head 76, are secured to baseplate 86. The displacement between sensor device 78 and sensor device 84 is measured with a z-coil 90 and a reference surface or plate 92.

A continuous web or sheet of material 130 such as paper, plastic, fabric and the like travels through the measurement channel between the upper and lower scanner heads in the machine direction (MD). In one embodiment, the radiation source 100 comprises a nuclear beta source to measure a property, such as the basis weight, of the material 130 by measuring the radiation intensity incident on the detector 102 when the material 130 is present as compared to the beta radiation which is incident upon the detector when no material is present. The readings are susceptible to errors if the vertical distance separating the radiation source 100 and radiation detector 102 fluctuate. Depending on the material being monitor, other sources of radiation such as, for instance, x-ray and infrared radiation, can be employed.

With the present invention, a PID controller 104 receives signals from the gap measurement means 90 and 92 and the controller is configured to transmit gap modulating signals to electric voltage sources 106, 108, 110 and 112. Increasing amplitude, decreasing amplitude, and the polarity of the voltage source all cause elongation or contraction.

In the scanning system 72 of FIG. 2, both the upper and lower sensor devices 78 and 84 are equipped with actuators to modulate the gap distance. As is apparent, the gap displacement can be modulated by configuring only one of the sensor devices with one or more actuators. However, having both sensor devices 78 and 84 maneuverable with the actuators achieves a faster response.

It should be noted that with the present invention it is not the vertical position of either scanner heads 74 and 76 that is adjusted with the actuators. The scanning heads (or mounting heads) are typically relatively large structures that house the sensor devices and other components. The sensor devices, such as the radiation source and detectors, are subject to frequency mechanical vibrations typically in the range of 10's to 100' Hz and largely limited to 1 kHz and below. The invention corrects the adverse effects caused by the vibrations by actuating a minimum mass at each sensor. The mass that must be controlled is the minimum mass that impacts the sensing principle being used. For instance, the sensor electronics do not need to be controlled but the radiation source does because the distance of the radiation source to the web affects intensity and therefore the measurement whereas the location of some circuitry does not impact the measurement. The speed of the feedback mechanism must be capable of offsetting these vibrations; this can be achieved with the piezoelectric actuators. The response time of these actuators can be up to 2 orders of magnitude faster than this (single microseconds) for actuation (gap) distances in the tens to hundreds of micrometers.

Figure 3:
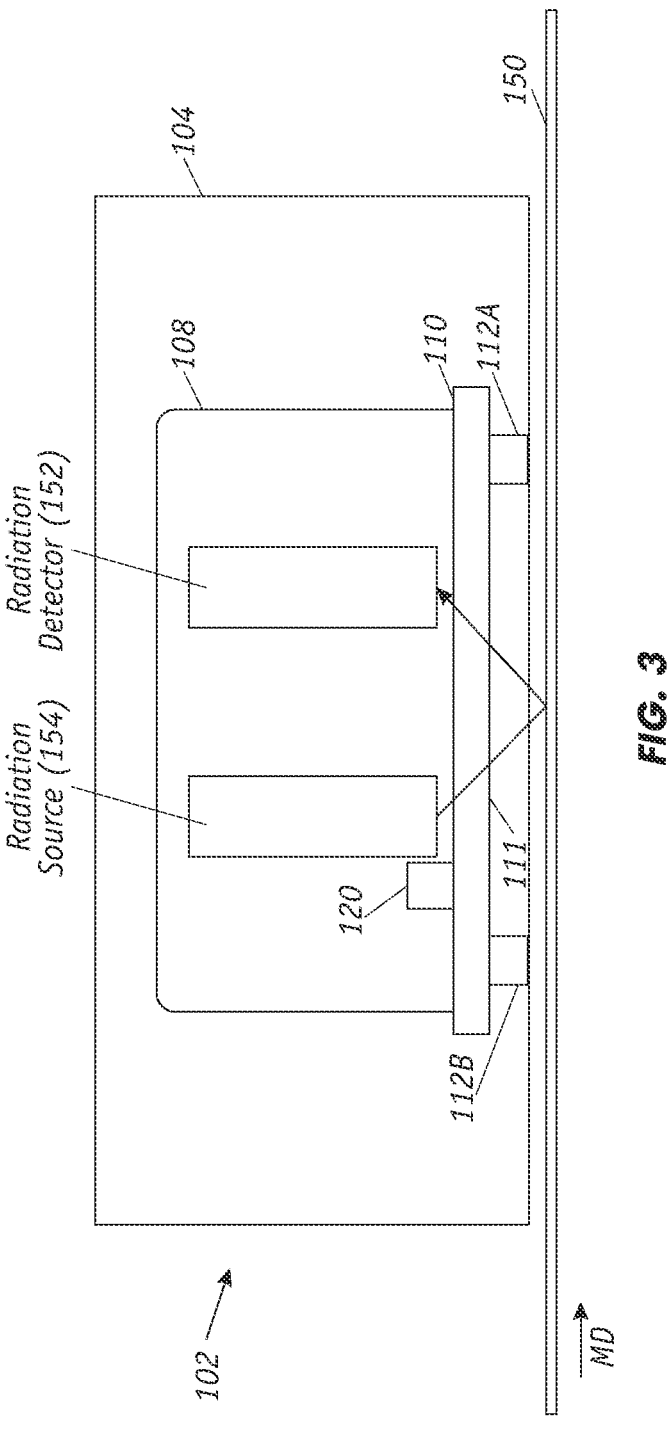
FIG. 3 a side cross-sectional view of dual scanner heads operating in the reflective mode.

FIG. 3 shows a scanning system 102 wherein the upper scanner (or mounting) head 104 houses a sensor device 108 that is supported on a baseplate 110. Actuators 112A and 112B, which are attached to the lower surface of the upper sensor head 104, are secured to baseplate 110, which has operative planar surface 111. The actuators move the baseplate 110 in a vertical direction whose axis is perpendicular operative planar surface 111. The sensor device 108 includes a radiation emitter source 154 and receiver detector 152.

A continuous web or sheet of material 150 moves pass the upper scanner head in the MD. The displacement between operative surface 111 and the upper surface of material 150 is measured with a laser triangulation device 120. In one embodiment, the radiation source 154 comprises an infrared radiation source that is focused onto the sheet of material 150; radiation that is reflected off from the material is captured by radiation detector 152. Actuators 112A and 112B maintain the gap distance between operative surface 111 and the upper surface of material 150.

Figure 4:
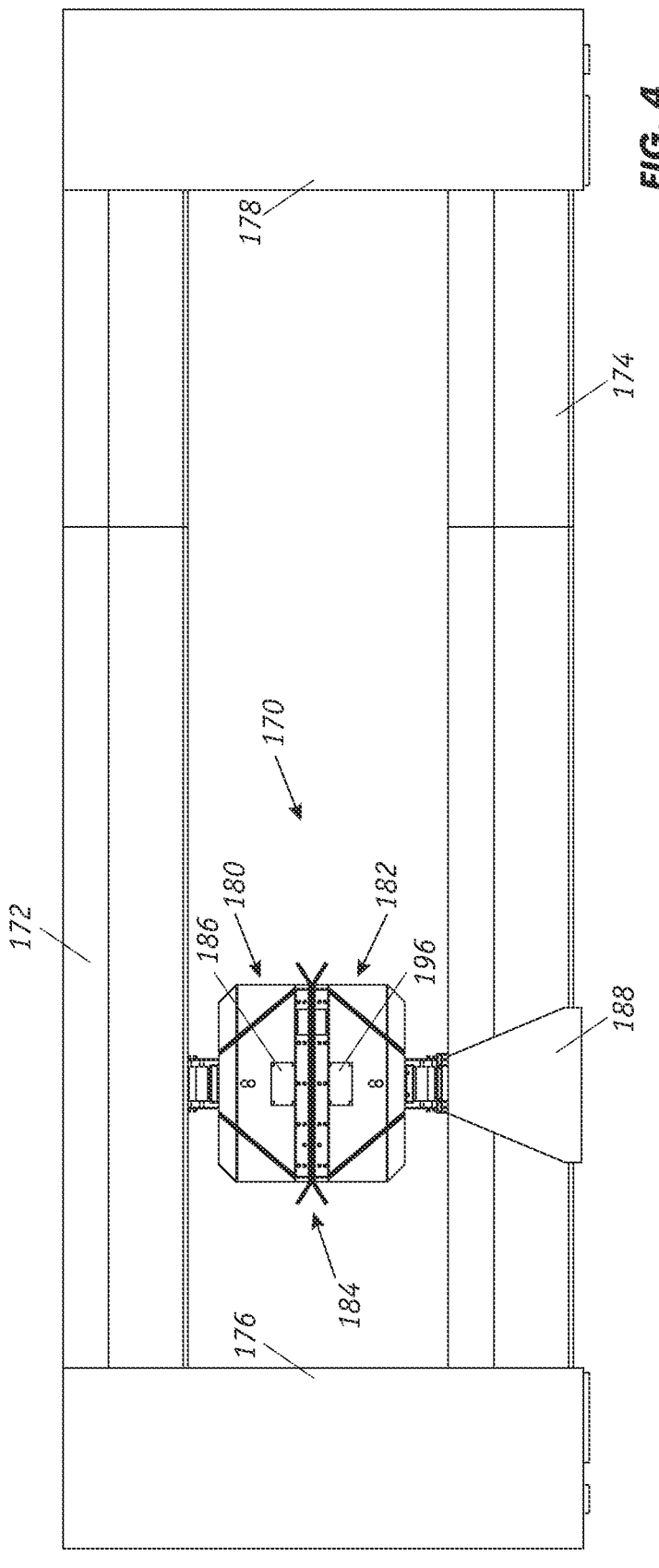
FIG. 4 illustrates a scanner in a web manufacturing or processing system.

FIG. 4 shows a dual scanner 170 in a web manufacturing or processing system. The scanner 170 travels back and forth along the cross direction, which is perpendicular to the MD direction of the moving web (not shown). The scanner 170 is driven by a motorized drive mechanism (not shown). The scanner 170 which includes an upper mounting head 180 and a lower mounting head 182 that are mounted on carriages that are supported by upper and lower rails 172 and 174, respectively. Movement of the two aligned mounting heads is synchronized and the heads define a channel or gap 184 through which the web travels. The support structures 176, 178 maintain separation of the rails. A web (not shown) passes horizontally between the support structures 176, 178 as the scanner travels over at least one surface of the web. In this embodiment, the scanner 170 has sensor devices 186 and 196 that operate in the transmissive mode to measure one or more characteristics of the web.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A system for measuring a property of a continuous sheet which has a first side and a second side and which travels in a downstream machine direction, the system comprising:
   (a) a first scanner head disposed adjacent to the first side of the sheet, the first scanner head comprising:
   (i) a first sensor device that has a first movable sensor base, wherein the first movable sensor base comprises a first baseplate that defines a first operative surface facing the first side of the sheet;
   (ii) a first adjustable actuator configured to move the first baseplate of the first movable sensor base along a first axis relative to the first scanner head, wherein the first axis is perpendicular to the first operative surface;
   (b) a second scanner head disposed adjacent to the second side of the sheet, the second scanner head comprising a second operative surface facing the second side of the sheet, wherein the first operative surface and the second operative surface define a sensor gap through which the continuous sheet travels;
   (c) at least one sensor for measuring a distance of the sensor gap and generating first signals representative of the measured sensor gap distance of the sensor gap; and
   (d) a controller for controlling the first adjustable actuator to move the first baseplate in response to the first signals to maintain the distance of the sensor gap distance at a desired gap distance.

2. The system of claim 1 wherein the first sensor device comprises a (i) source radiation that is transmitted toward the continuous sheet and a (ii) detector that is configured to receive reflected radiation.

3. The system of claim 1 wherein the first sensor device comprises a source of radiation that is transmitted toward the continuous sheet and the second scanner head comprises a second sensor device that comprises a detector and that defines the second operative surface.

4. The system of claim 3 wherein the second sensor device further comprises:
   a second movable sensor base, wherein the second movable sensor base comprises a second baseplate; and
   a second adjustable actuator configured to move the second baseplate of the second sensor device along a second axis relative to the second scanner head, wherein the second axis is perpendicular to the second operative surface, and
   wherein the controller controls the first adjustable actuator and second adjustable actuator to move the second baseplate in response to the first signals to maintain the sensor gap distance at the desired gap distance.

5. The system of claim 4 wherein the second base plate of the second movable sensor base defines the second operative surface.

6. The system of claim 3 wherein the source of radiation comprises one of: a nuclear source of beta radiation, an x-ray source, or an IR source.

7. The system of claim 1 wherein the first adjustable actuator comprises a piezoelectric actuator.

8. The system of claim 1 wherein the first operative surface defines a planar surface and the first axis is perpendicular to the first operative surface.

9. The system of claim 1 wherein the first scanner head is aligned with the second scanner head and the first and second scanner heads are configured move back and forth along a cross direction which is perpendicular to the machine direction.

10. The system of claim 1 wherein the continuous sheet comprises paper, plastic, metal, or coated metal substrate.

11. The system of claim 1 wherein the continuous sheet comprises metal foil or coated metal substrate and the at least one sensor for the distance of the sensor gap comprises a magnetic displacement sensor.

12. A system for monitoring characteristics of a continuous sheet which has a first side and a second side and which travels in a downstream machine direction that comprises:

(a) a first mounting head, which is disposed adjacent to a first side exterior surface of the sheet, comprising:

(i) a first sensor device that has a first movable sensor base, wherein the first movable sensor base comprises of a first baseplate that defines a first operative surface facing the first side exterior surface of the sheet;

(ii) a first adjustable actuator configured to move the first baseplate of the first movable sensor base along a first axis relative to the first mounting head, wherein the first axis is perpendicular to the first operative surface;

(b) a second mounting head disposed adjacent to the second side exterior of the sheet, the second mounting head comprising a second operative surface facing the second side exterior surface of the sheet, wherein the first operative surface and the second operative surface define a sensor gap through which the continuous sheet travels, wherein the first mounting head and the second mounting head are aligned and configured to move in a synchronized fashion in the cross direction, which is perpendicular to the machine direction, and wherein at least one sensor device is mounted in the first mounting head, the second mounting head, or in both;

(c) at least one sensor for measuring a distance of the sensor gap and generating first signals representative of the measured sensor gap distance of the sensor gap; and (d) a controller for controlling the first adjustable actuator to move the first baseplate in response to the first signals to maintain the measurement gap distance of the sensor gap at a desired gap distance.

13. The system of claim 12 wherein the second mounting head further comprises:

a second movable sensor base, wherein the second movable sensor base comprises of a second baseplate that defines the second operative surface facing the second side exterior of the sheet; and a second adjustable actuator configured to move the second baseplate of the second sensor base along a second axis relative to the second mounting head, wherein the second axis is perpendicular to the second operative surface, and wherein the controller is configured to control the first actuator and second actuator to move the second baseplate in response to the first signals to maintain the measurement sensor gap distance at the desired gap distance.

14. A method of controlling a sensor gap between an operative surface and a continuous traveling web in a system for monitoring characteristics of the continuous travelling web, which has a first side and a second side and which travels in a downstream machine direction, the system including:

a first mounting head, which is disposed adjacent to a first side exterior surface of the continuous travelling web, comprising:

(i) a first sensor device that has a first movable sensor base, wherein the first movable sensor base comprises a first baseplate that defines a first operative surface facing the first side exterior surface of the continuous travelling web;

(ii) a first adjustable actuator configured to move the first baseplate of the first movable sensor base along a first axis relative to the first mounting head, wherein the first axis is perpendicular to the first operative surface;

a second mounting head disposed adjacent to the second side of the continuous travelling web, the second mounting head comprising a second operative surface facing a second side exterior surface of the continuous travelling web, wherein the first operative surface and the second operative surface define a sensor gap through which the continuous travelling web travels, wherein the first mounting head and the second mounting head are aligned and configured to move in a synchronized fashion in the cross direction, which is perpendicular to the machine direction;

at least one gap sensor for measuring a distance of the sensor gap and generating first signals representative of the measured sensor gap distance of the sensor gap; and a controller for controlling the first adjustable actuator to move the first baseplate in response to the first signals to maintain the measurement gap distance of the sensor gap at a desired gap distance;

wherein the method comprises:

(a) the gap sensor monitoring the distance between the first operative surface and the second operative surface and generating distance signals indicating a measured sensor gap distance;

(b) comparing the measured sensor gap distance to a target sensor gap distance; and (c) maneuvering the first adjustable actuator to adjust the sensor gap distance.

15. The method of claim 14 wherein the first adjustable actuator comprises a piezoelectric actuator.

16. The method of claim 14 wherein the continuous travelling web comprises paper, plastic, metal foil, or coated metal substrate.

17. The method of claim 14 wherein the first sensor device is subject to mechanical vibrations.

18. The method of claim 17 wherein the mechanical vibrations exhibit frequencies that are less than 1 kHz.

* * * * *